US012566395B2

(12) United States Patent
Endo

(10) Patent No.: US 12,566,395 B2
(45) Date of Patent: Mar. 3, 2026

(54) IMAGE FORMING APPARATUS

(71) Applicant: Toshiba Tec Kabushiki Kaisha, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/812,110

(22) Filed: Aug. 22, 2024

(65) Prior Publication Data

US 2024/0411254 A1 Dec. 12, 2024

Related U.S. Application Data

(63) Continuation of application No. 18/317,719, filed on May 15, 2023, now abandoned, which is a continuation of application No. 17/510,894, filed on Oct. 26, 2021, now Pat. No. 11,687,017.

(30) Foreign Application Priority Data

Feb. 18, 2021 (JP) ................................ 2021-024369

(51) Int. Cl.
*G03G 15/20* (2006.01)
*G03G 15/00* (2006.01)

(52) U.S. Cl.
CPC ....... *G03G 15/205* (2013.01); *G03G 15/2017* (2013.01); *G03G 15/2053* (2013.01); *G03G 15/5029* (2013.01); *G03G 15/5054* (2013.01)

(58) Field of Classification Search
CPC ............. G03G 15/205; G03G 15/2017; G03G 15/2053
See application file for complete search history.

(56) References Cited

U.S. PATENT DOCUMENTS

2012/0141174 A1 6/2012 Kurita et al.
2014/0010563 A1 1/2014 Iwai et al.
2014/0064763 A1 3/2014 Watanabe
2014/0153938 A1 6/2014 Saito
(Continued)

FOREIGN PATENT DOCUMENTS

JP 2003-122185 A 4/2003
JP 2003215973 A 7/2003
JP 2007206204 A 8/2007
(Continued)

OTHER PUBLICATIONS

Notice of Reasons for Refusal mailed Jul. 9, 2024 in corresponding Japanese Patent Application No. 2021-024369, with English Machine Translation, 8 pages.

(Continued)

*Primary Examiner* — Thomas S Giampaolo, II
(74) *Attorney, Agent, or Firm* — Kim & Stewart LLP

(57) ABSTRACT

According to an embodiment, an image forming apparatus includes: a motor that drives a fixing device; and a controller. The motor outputs a signal corresponding to a driving current value of the motor. The controller performs a first operation where a magnitude value of the signal has fallen out of a first range while driving the motor in a first operation mode. The controller performs a second operation where the magnitude value of the signal has fallen out of a second range while driving the motor in a second operation mode.

10 Claims, 8 Drawing Sheets

(56) References Cited

U.S. PATENT DOCUMENTS

2018/0017911 A1 1/2018 Watanabe

FOREIGN PATENT DOCUMENTS

| | | | |
|---|---|---|---|
| JP | 2008287242 | A | 11/2008 |
| JP | 2011-017917 | A | 1/2011 |
| JP | 2012-118339 | A | 6/2012 |
| JP | 2015-114610 | A | 6/2015 |
| JP | 2017-040801 | A | 2/2017 |
| JP | 2018010122 | A | 1/2018 |

OTHER PUBLICATIONS

Notice of Reasons for Refusal (First Office Action) mailed Dec. 2, 2025 in corresponding Japanese Patent Application No. 2025-004250, with English machine translation, 9 pages.

IMAGE FORMING APPARATUS

CROSS-REFERENCE TO RELATED APPLICATIONS

This application is a continuation of U.S. patent application Ser. No. 18/317,719, filed on May 15, 2023, which is a continuation of U.S. patent application Ser. No. 17/510,894, filed on Oct. 26, 2021, now U.S. Pat. No. 11,687,017, issued on Jun. 27, 2023, which is based upon and claims the benefit of priority from the prior Japanese Patent Application No. 2021-024369, filed on Feb. 18, 2021, the entire contents of each of which are incorporated herein by reference.

FIELD

An embodiment to be described here generally relates to an image forming apparatus.

BACKGROUND

In the past, an image forming apparatus that is capable of detecting the value of a parameter indicating the state of a motor that drives a fixing device and determining whether or not an error has occurred in the fixing device in accordance with the detected value of the parameter has been known. Examples of the parameter indicating the state of a motor include the torque of the motor and the driving current of the motor.

However, the value of the parameter indicating the state of a motor varies depending on the RPM of the motor and the like. For this reason, in the image forming apparatus described above, when, for example the motor is driven at the RPM different from a predetermined RPM, it is sometimes difficult to accurately determine whether or not an error has occurred in the fixing device. As a result, in some cases, it has been difficult for the image forming apparatus to perform, at a desired timing, an operation corresponding to an error that has occurred in the fixing device.

Figure 1:
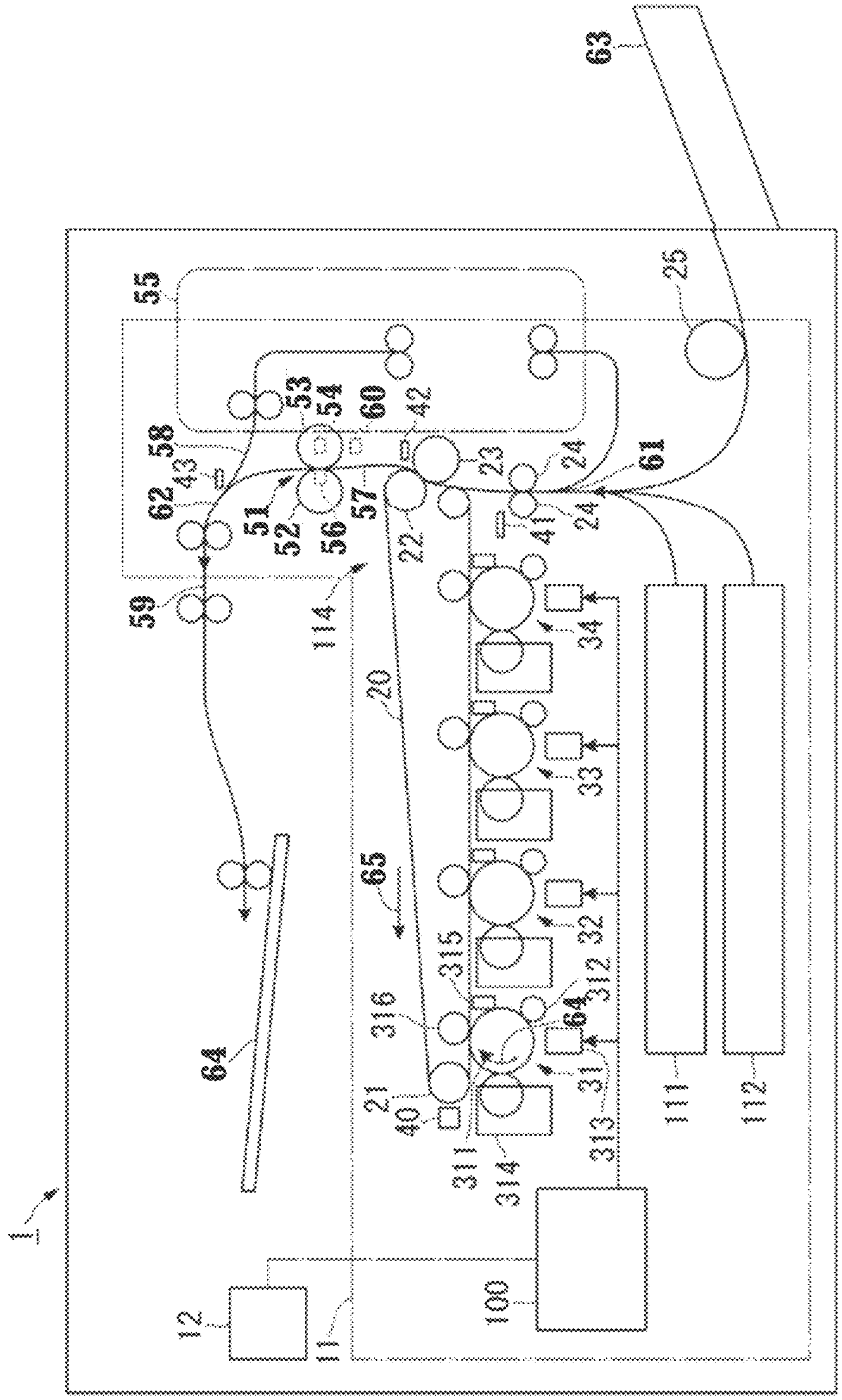
FIG. 1 is a cross-sectional view showing an example of an image forming apparatus according to an embodiment.

DETAILED DESCRIPTION (Overview of Image Forming Apparatus)

In accordance with an embodiment, an image forming apparatus forms a target image for forming an image on a printing medium using a toner as a colorant. The image forming apparatus includes a transport device, an image forming device, a fixing device, a motor, and a controller. The transport device transports the printing medium. The image forming device forms a toner image of the target image on the printing medium transported by the transport device. The fixing device heats the printing medium after the toner image is formed by the image forming device, and fixes the toner image to the printing medium as the target image. The motor drives the fixing device. The motor outputs a signal having a magnitude value corresponding to a value of a driving current of the motor. The controller drives the motor in a first operation mode or a second operation mode. The controller performs a first operation where the magnitude value of the signal has fallen out of a first range while driving the motor in the first operation mode. The controller performs a second operation where the magnitude value of the signal has fallen out of a second range while driving the motor in the second operation mode, the magnitude value of the signal in the second range being different from that of the first range.

As a result, the image forming apparatus according to the embodiment is capable of performing, at a desired timing, an operation corresponding to an error that has occurred in the fixing device.

The image forming apparatus according to the embodiment will be described with reference to the drawings. In the drawings, the same components are denoted by the same reference symbols.

(Configuration of Image Forming Apparatus)

Figure 2:
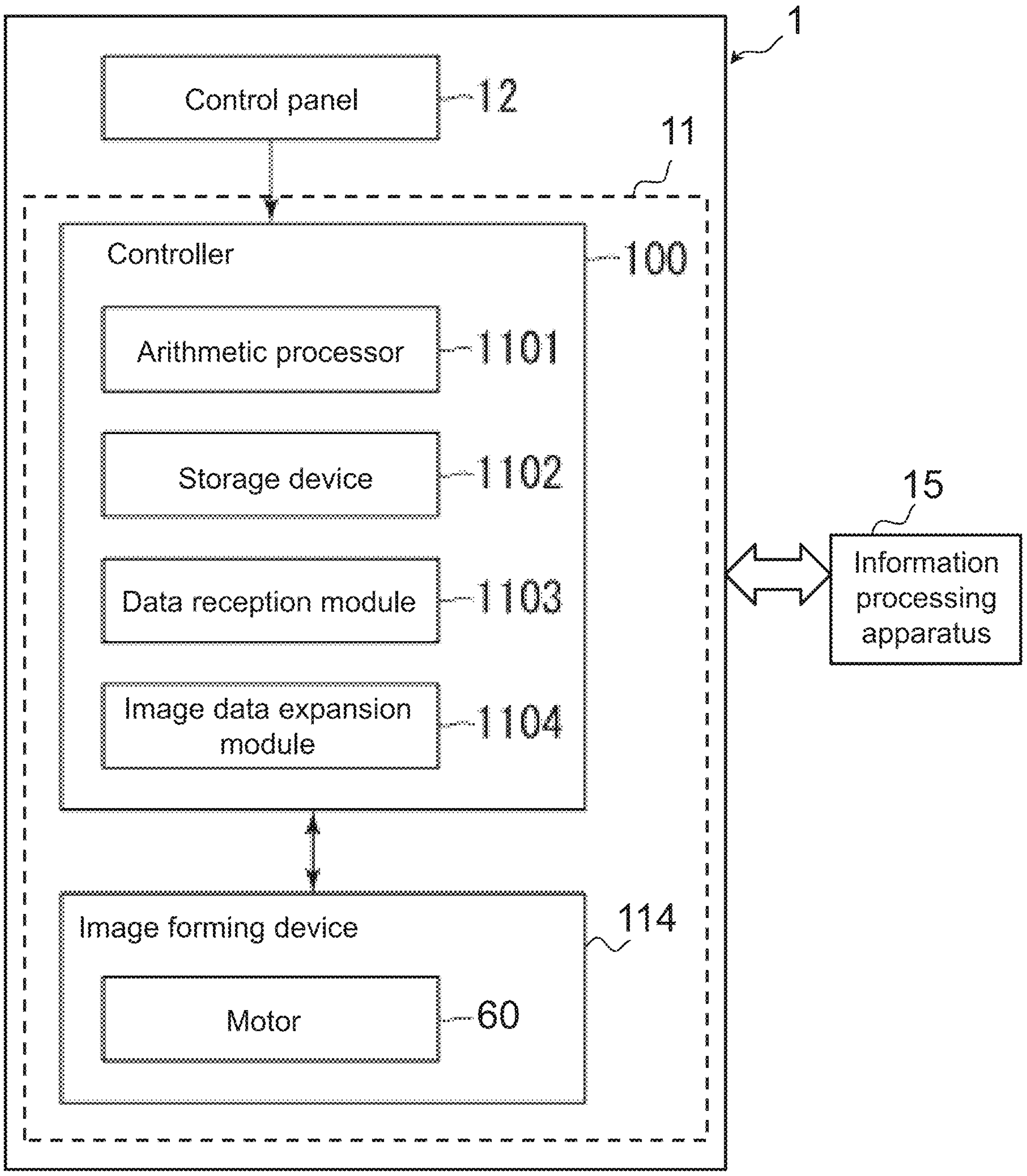
FIG. 2 is a block diagram showing an example of a controller according to an embodiment.

A configuration of the image forming apparatus according to the embodiment will be described. As an example of the image forming apparatus, an image forming apparatus 1 will be described. FIG. 1 and FIG. 2 are each a diagram showing an example of the configuration of the image forming apparatus 1.

The image forming apparatus 1 is an apparatus that forms an image on a printing medium. For example, the image forming apparatus 1 includes a multifunction peripheral, a copier, a printer, or the like. The printing medium is a medium on which the image forming apparatus 1 performs processing such as forming an image. The printing medium may be an arbitrary medium as long as it is a sheet-like medium capable of forming an image on at least one of both surfaces. For example, the printing medium is a printing paper or a plastic film.

As shown in FIG. 1, the image forming apparatus 1 includes a printer unit 11, a control panel 12, a manual feed tray 63, and a discharge tray 64. The image forming apparatus 1 may include another member, another device, and the like in addition to the printer unit 11, the control panel 12, the manual feed tray 63, and the discharge tray 64.

As shown in FIG. 1, the printer unit 11 includes a controller 100, sheet feeding cassettes 111 and 112, and an image forming device 114.

The controller 100 of the printer unit 11 controls the entire image forming apparatus 1. In other words, as shown in FIG. 2, the controller 100 controls the printer unit 11, the control panel 12, and the image forming device 114 of the printer unit 11.

The sheet feeding cassette 111 houses a printing medium of a kind desired by a user. For example, the sheet feeding cassette 111 houses A4-sized plain paper.

The sheet feeding cassette 112 houses a printing medium of a kind desired by a user. For example, the sheet feeding cassette 112 houses A4-sized thick paper.

The control panel 12 includes an operation receiving device and a display device.

The operation receiving device of the control panel 12 receives an operation from a user. The operation receiving device includes an input device. For example, the operation receiving device includes a touch pad or an input key. The operation receiving device outputs, upon receiving an operation from the user, information indicating the received operation to the controller 100.

The display device of the control panel 12 displays an image corresponding to the operation received through the operation receiving device. The display device includes an image display device. For example, the display device may include a liquid crystal display or an organic electroluminescence (EL) display. The display device may be configured integrally with the operation receiving device as a touch panel.

The image forming device 114 transports the printing medium and forms an image indicated by the image data acquired from the controller 100 on the printing medium, under the control of the controller 100. For convenience of description, forming an image on a printing medium is referred to as printing.

(Configuration of Image Forming Device)

A configuration of the image forming device 114 will be described.

The image forming device 114 includes an intermediate transfer belt 20, a driven roller 21, a backup roller 22, a secondary transfer roller 23, two resist rollers 24, and a manual feed roller 25. The image forming device 114 includes four sets of image forming stations 31, 32, 33, and 34. The image forming device 114 includes a belt cleaner 40, a first detector 41, a second detector 42, and a third detector 43. The image forming device 114 further includes a fixing device 51, a motor 60, and a double-sided printing device 55.

The intermediate transfer belt 20 is a blet on which a toner image is primarily transferred by the four sets of image forming stations 31, 32, 33, and 34. That is, a toner image is formed on the intermediate transfer belt 20. The intermediate transfer belt 20 is supported by the driven roller 21, the backup roller 22, and the like. The intermediate transfer belt 20 rotates in a direction indicated by an arrow 65 shown in FIG. 1. More specifically, the image forming device 114 causes the intermediate transfer belt 20 to rotate in the direction 65 by a motor (not shown) under the control of the controller 100.

The image forming station 31 is for forming an image of yellow (Y). The image forming station 32 is for forming an image of magenta (M). The image forming station 33 is for forming an image of cyan (C). The image forming station 34 is for forming an image of black (K). In the image forming device 114, the four sets of image forming stations 31, 32, 33, and 34 are disposed below the intermediate transfer belt 20 along the rotation direction 65 of the intermediate transfer belt 20.

The image forming station 31 includes a photoreceptor drum 311, a charging charger 312, an exposure scanning head 313, a developing device 314, a photoreceptor cleaner 315, and a primary transfer roller 316. In the image forming station 31, the charging charger 312, the exposure scanning head 313, the developing device 314, the photoreceptor cleaner 315, and the primary transfer roller 316 are disposed around the photoreceptor drum 311 that rotates in a direction indicated by an arrow 66 shown in FIG. 1. The primary transfer roller 316 faces the photoreceptor drum 311 via the intermediate transfer belt 20.

The configuration of each of the image forming stations 32, 33, and 34 is the same as the configuration of the image forming station 31. For this reason, description of the configuration of each of the image forming stations 32, 33, and 34 will be omitted below.

The secondary transfer roller 23 faces the backup roller 22 via the intermediate transfer belt 20. The secondary transfer roller 23 secondarily transfers the toner image primarily transferred to the intermediate transfer belt 20 to a printing medium that passes between the secondary transfer roller 23 and the intermediate transfer belt 20.

The two resist rollers 24 transports, between the secondary transfer roller 23 and the intermediate transfer belt 20, a printing medium taken out from each of the sheet feeding cassette 111, the sheet feeding cassette 112, and the manual feed tray 63 by a transport mechanism (not shown).

The manual feed roller 25 takes out a printing medium from the manual feed tray 63 and transports the printing medium to the two resist rollers 24.

The belt cleaner 40 removes the toner remaining on the intermediate transfer belt 20 under the control of the controller 100.

The first detector 41 is a sensor that detects that a printing medium has passed between the two resist rollers 24. In the embodiment, the passage of a printing medium between the two resist rollers 24 means that the printing medium has been transported by the two resist rollers 24. The first detector 41 is provided at a position capable of detecting that a printing medium has passed between the two resist rollers 24. The first detector 41 includes, for example, an optical sensor. The first detector 41 may include, instead of the optical sensor, another sensor capable of detecting that a printing medium has passed between the two resist rollers 24. The first detector 41 outputs, in the case of detecting that a printing medium has passed between the two resist rollers 24, information indicating that a printing medium has passed between the two resist rollers 24 to the controller 100.

The second detector 42 includes a sensor that detects that a printing medium has passed between the secondary transfer roller 23 and the intermediate transfer belt 20. In the embodiment, the passage of a printing medium between the secondary transfer roller 23 and the intermediate transfer belt 20 means that the printing medium has been transported by the secondary transfer roller 23. The second detector 42 is provided at a position capable of detecting that a printing medium has passed between the secondary transfer roller 23 and the intermediate transfer belt 20. The second detector 42 includes, for example, an optical sensor. The second detector 42 may include, instead of the optical sensor, another sensor capable of detecting that a printing medium has passed between the secondary transfer roller 23 and the intermediate transfer belt 20. The second detector 42 outputs, in the case of detecting that a printing medium has passed between the secondary transfer roller 23 and the intermediate transfer belt 20, information indicating that a printing medium has passed between the secondary transfer roller 23 and the intermediate transfer belt 20 to the controller 100.

The third detector 43 includes a sensor that detects that a printing medium has been discharged to the discharge tray 64. The third detector 43 is provided at a position capable of detecting that a printing medium has been discharged to the discharge tray 64. The third detector 43 includes, for example, an optical sensor. The third detector 43 may include, instead of the optical sensor, another sensor capable of detecting that a printing medium has been discharged to the discharge tray 64. The third detector 43 outputs, in the case of detecting that a printing medium has been discharged to the discharge tray 64, information indicating that a printing medium has been discharged to the discharge tray 64 to the controller 100.

The fixing device 51 includes a fixing member 52, a heater 56, a pressing member 53, and a pressing adjustment mechanism 54.

The fixing member 52 includes a member having an endless peripheral surface. For example, the fixing member 52 includes a belt-like member. The fixing member 52 abuts against the outer peripheral surface of the pressing member 53. The fixing member 52 rotates with the pressing member 53 against which the fixing member 52 abuts. The heater 56 is provided inside the fixing member 52. A support member that rotatably supports the fixing member 52 is provided inside the fixing member 52. In FIG. 1, the support member is omitted to simplify the drawing.

The heater 56 heats the fixing member 52. For example, the heater 56 includes a heat source and a to-be-heated member to be heated by the heat source. In this case, the to-be-heated member is slidably in contact with the fixing member 52. The heater 56 heats the to-be-heated member by the heat source of the heater 56, and heats the fixing member 52 in contact with the to-be-heated member.

The pressing member 53 includes a roller that abuts against the outer peripheral surface of the fixing member 52. The driving force of the motor 60 is transmitted to the pressing member 53 via a gear or the like. In other words, the pressing member 53 is caused to rotate by the driving of the motor 60.

The pressing member 53 is pressed against the outer peripheral surface of the fixing member 52 by a biasing member such as a spring. The pressing member 53 is pressed against the fixing member 52 to form a nip with the fixing member 52. In other words, the pressing member 53 comes into contact with the fixing member 52 to form a nip with the fixing member 52. The force by the biasing member for pressing the pressing member 53 against the fixing member 52 is adjusted by the controller 100 via the pressing adjustment mechanism 54. For convenience of description, the force is referred to as the pressing force. In the fixing device 51, instead of the configuration in which the pressing member 53 is pressed against the outer peripheral surface of the fixing member 52 by the biasing member, a configuration in which the fixing member 52 is pressed against the outer peripheral surface of the pressing member 53 by the biasing member may be employed. In this case, the pressing force represents the force by the biasing member for pressing the fixing member 52 against the pressing member 53.

The pressing adjustment mechanism 54 moves, under the control of the controller 100, the pressing member 53 in a direction away from the fixing member 52 to adjust the pressing force. For example, the pressing adjustment mechanism 54 moves the pressing member 53 in a direction away from the fixing member 52 to separate the pressing member 53 from the fixing member 52. In this case, the pressing force is 0 N. For example, the pressing adjustment mechanism 54 moves the pressing member 53 in a direction away from the fixing member 52 to causes the pressing force to match with the force corresponding to the control of the controller 100. In the case of the configuration in which the fixing member 52 is pressed against the outer peripheral surface of the pressing member 53 by the biasing member, the pressing adjustment mechanism 54 moves, under the control of the controller 100, the fixing member 52 in a direction away from the pressing member 53 to adjust the pressing force.

The fixing device 51 includes a device that fixes a toner image to the printing medium to which the toner image has been secondarily transferred by the secondary transfer roller 23. More specifically, the fixing device 51 performs pressing and heating while transporting the printing medium by the fixing member 52 and the pressing member 53. As a result, the fixing device 51 fixes the toner image that has been secondarily transferred to the printing medium to the printing medium. As a result, an image is formed on the printing medium.

The motor 60 drives the fixing device 51. The motor 60 includes a circuit that outputs, to the controller 100, a signal having a magnitude corresponding to the value of the driving current of the motor 60. The circuit may be an arbitrary circuit as long as it is capable of outputting the signal to the controller 100. The motor 60 includes, for example, a servo motor. The motor 60 causes the pressing member 53 to rotate via a gear or the like. The motor 60 may include, instead of the servo motor, another type of motor that can be controlled by the controller 100.

The double-sided printing device 55 includes a device that re-transports, to the two resist rollers 24, the printing medium having a surface on which an image has been formed by the fixing device 51. The printing medium whose front surface and back surface have been reversed is transported to the double-sided printing device 55. For this reason, an image is formed, via the secondary transfer roller 23 and the fixing device 51, on the back surface of the printing medium transported between the two resist rollers 24 via the double-sided printing device 55.

(Operation of Image Forming Device)

An operation of the image forming device 114 will be described.

First, the operations of the four sets of image forming stations 31, 32, 33, and 34 will be described using an operation of the image forming station 31 as an example.

The image forming station 31 charges the photoreceptor drum 311 by the charging charger 312 and then exposes the photoreceptor drum 311 by the exposure scanning head 313. As a result, the image forming station 31 forms an electrostatic latent image on the photoreceptor drum 311. After that, the image forming station 31 causes the developing device 314 to develop the electrostatic latent image on the photoreceptor drum 311. The developing device 314 forms a toner image on the photoreceptor drum 311 by, for example, developing an electrostatic latent image on the photoreceptor drum 311 using a two-component developer including a toner and a carrier. In this way, a toner image is formed on the photoreceptor drum 311. The primary transfer roller 316 primarily transfers the toner image formed on the photoreceptor drum 311 to the intermediate transfer belt 20. After the primary transfer is performed, the photoreceptor cleaner 315 removes the toner remaining on the photoreceptor drum 311.

Each of the image forming stations 31, 32, 33, and 34 forms a color toner image on the intermediate transfer belt 20 by the primary transfer roller 316. The color toner image is formed by sequentially superimposing toner images of Y (yellow), M (magenta), C (cyan), and K (black) on each other.

Next, an operation of the secondary transfer roller 23 will be described. The secondary transfer roller 23 secondarily transfers the color toner images on the intermediate transfer belt 20 collectively to the printing medium that passes between the secondary transfer roller 23 and the intermediate transfer belt 20. In the following description, the term "toner image" may be one of the color toner image and the toner image having only one color. The toner image may be a toner image using a color-erasable toner.

Next, an operation of transporting a printing medium among the operations of the image forming device 114 will be described.

In the nip between the two resist rollers 24, a printing medium taken out from each of the sheet feeding cassette 111, the sheet feeding cassette 112, and the manual feed tray 63 is bent by a transport mechanism (not shown). As a result, the position of the front end of the printing medium is adjusted. After that, the two resist rollers 24 transports a printing medium between the secondary transfer roller 23 and the intermediate transfer belt 20 in accordance with the timing at which the image forming device 114 transfers a toner image to the printing medium. The transport paths through which the printing media taken out from the sheet feeding cassette 111, the sheet feeding cassette 112, and the manual feed tray 63 are transferred to the two resist rollers 24 merge at a merging portion 61 shown in FIG. 1.

In the image forming device 114, the two resist rollers 24, the fixing device 51, and a plurality of rollers in the double-sided printing device 55 constitute three transfer paths 57, 58, and 59. The transfer path 57 is a transfer path from the merging portion 61 to a branch portion 62 shown in FIG. 1. The transfer path 58 is a transfer path from the branch portion 62 to the merging portion 61, which passes through the double-sided printing device 55. The transfer path 59 is a transfer path from the branch portion 62 to the discharge tray 64.

The two resist rollers 24 start to rotate in accordance with the position of the toner image of the rotating intermediate transfer belt 20 and causes the printing medium to move to the position of the secondary transfer roller 23. As a result, the toner image formed on the intermediate transfer belt 20 is secondarily transferred to the printing medium by the secondary transfer roller 23. After the toner image is secondarily transferred to the printing medium, the secondary transfer roller 23 transports the printing medium to the fixing device 51 along the transfer path 57. The fixing device 51 fixes the toner image secondarily transferred to the printing medium to the printing medium while transporting the printing medium, the toner image being transferred from the secondary transfer roller 23. As a result, the secondarily-transferred toner image is formed as an image on the printing medium. After the image is formed on the printing image, the fixing device 51 transports the printing medium to the transfer path 59. Then, the printing medium transported to the transfer path 59 is discharged by a roller (not shown).

In the case of double-sided printing, after an image is formed on the surface and then the entire printing medium passes through the branch portion 62, a roller (not shown) transports the printing medium to the transfer path 58 by switch back. As a result, the front surface and back surface of the printing medium are reversed. After that, the plurality of rollers in the double-sided printing device 55 transports the printing medium to the nip between the two resist rollers 24 along the transfer path 58. Then, the printing medium whose front surface and back surface have been reversed is transported via the two resist rollers 24 along the transfer path 57, and a toner image is fixed by the fixing device 51. As a result, an image is formed on the back surface of the printing medium. The fixing device 51 transports the printing medium having the back surface on which an image has been formed to the transfer path 59 for discharging the printing medium.

As described above, the secondary transfer roller 23, the two resist rollers 24, the fixing device 51, and the various rollers in the double-sided printing device 55 constitute a transport device that transports a printing medium in the image forming apparatus 1.

(Functional Configuration of Controller)

A functional configuration of the controller 100 will be described with reference to FIG. 2. FIG. 2 is a diagram showing an example of a functional configuration of the controller 100.

As shown in FIG. 2, the controller 100 is configured to be capable of communicating with the printer unit 11 and the control panel 12. The controller 100 includes an arithmetic processor 1101, a storage device 1102, a data reception module 1103, and an image data expansion module 1104.

The arithmetic processor 1101 includes, for example, a CPU (Central Processing Unit), an ASIC (Application Specific Integrated Circuit), or the like. The arithmetic processor 1101 controls the printer unit 11 and the control panel 12 in accordance with an image processing program stored in the storage device 1102.

The storage device 1102 includes, a ROM (Read Only Memory), a RAM (Random Access Memory), an HDD (Hard Disk Drive), an SSD (Solid State Drive), or the like. The storage device 1102 may be separated from the controller 100.

The data reception module 1103 receives, from a host such as a PC (Personal Computer), print data (e.g., data described in a page description language) indicating an image to be printed, and stores the received print data in the storage device 1102.

The image data expansion module 1104 determines the printing condition from the print data stored in the storage device 1102 by the data reception module 1103, expands the print data into data that can be printed by the printer unit 11 (e.g., raster data), and stores the expanded data in the storage device 1102.

(Operation Mode of Image Forming Apparatus)

An operation mode of the image forming apparatus 1 will be described below. The image forming apparatus 1 is capable of performing an operation of forming an image on a printing medium in one of a plurality of operation modes in accordance with the type of the printing medium. A case where the image forming apparatus 1 performs an operation of forming an image on a printing medium in one of a first operation mode and a second operation mode in accordance with the type of the printing medium will be described as an example.

The first operation mode is an operation mode in which the motor 60 is driven at a first RPM. For example, the image forming apparatus 1 performs, in the case of forming an image on A4-sized plain paper, an operation of forming an image on the plain paper in the first operation mode. The first RPM is, for example, 1500 rpm. The first RPM may be lower than 1500 rpm or higher than 1500 rpm.

The second operation mode is an operation mode in which the motor 60 is drive at a second RPM. For example, the image forming apparatus 1 performs, in the case of forming an image on A4-sized thick paper, an operation of forming an image on the thick paper in the second operation mode. The second RPM is, for example, 940 rpm. The second RPM may be lower than 940 rpm or higher than 940 rpm.

(Relationship Between Value of Driving Current of Motor and Magnitude of Signal Output from Motor)

Figure 3:
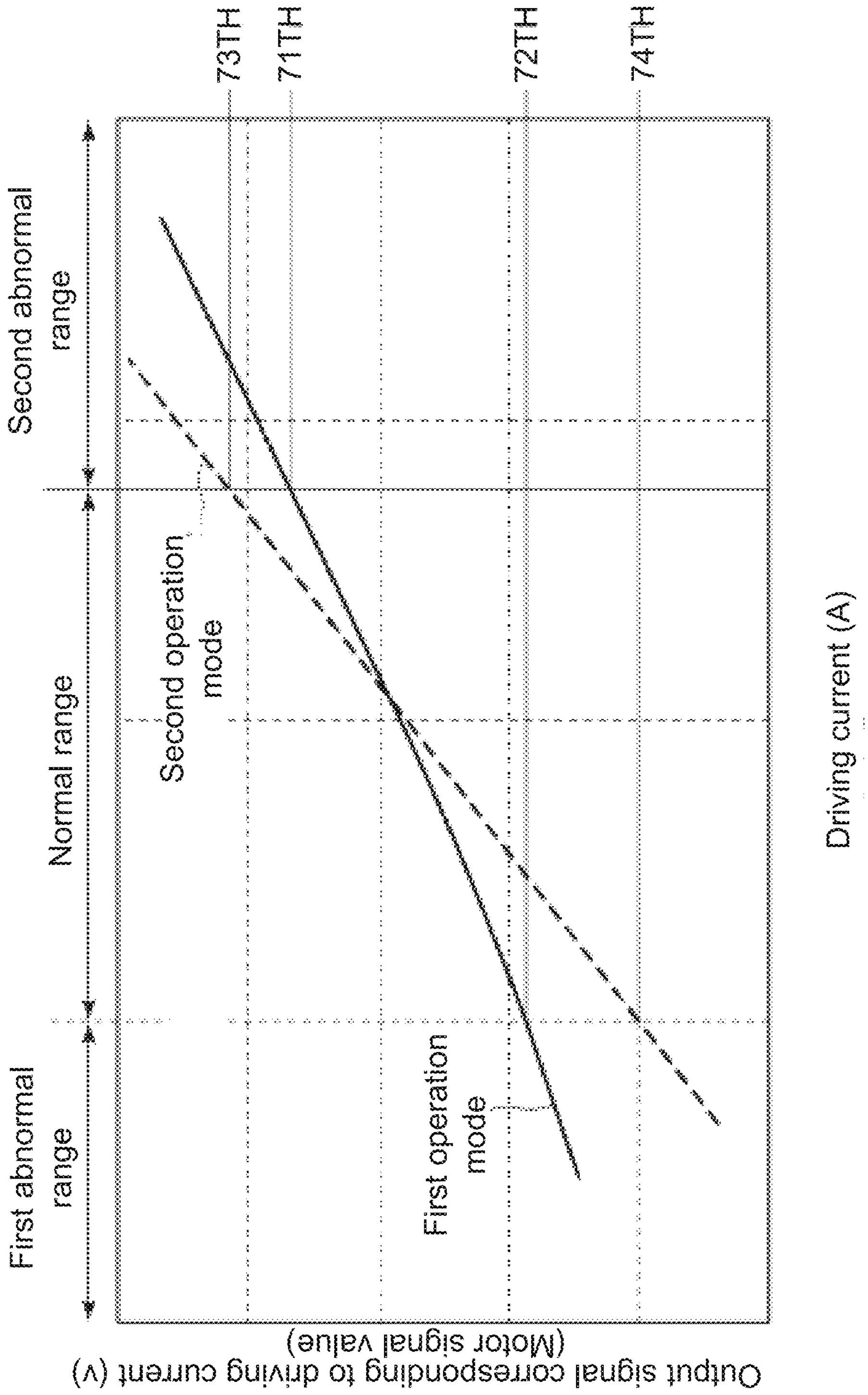
FIG. 3 is a diagram showing an example of a first correspondence between a driving current value of a motor according to the embodiment and a signal value output from the motor.

A relationship between a value of a driving current of the motor 60 and the magnitude of a signal output from the motor 60 will be described. For convenience of description, the value of the driving current of the motor 60 will be described as the driving current value. For convenience of description, the signal will be described as the motor signal. For convenience of description, the magnitude of the motor signal will be described as the motor signal value. For convenience of description, the relationship between the driving current value and the motor signal value will be described as the first correspondence. FIG. 3 is a diagram showing an example of the first correspondence.

The horizontal axis of the graph shown in FIG. 3 indicates the driving current value. The driving current value varies depending on the load of the motor 60. For example, in the case where the fixing device 51 driven by the motor 60 normally operates, the driving current value indicates a value within a normal range shown in FIG. 3. For example, in the case where the abutting failure between the fixing member 52 and the pressing member 53 occurs in the fixing device 51 driven by the motor 60, the driving current value indicates a value within a first abnormal range shown in FIG. 3. For example, in the case where the lubricant in the fixing member 52 is depleted in the fixing device 51 driven by the motor 60, the driving current value indicates a value within a second abnormal range shown in FIG. 3.

The vertical axis of the graph shown in FIG. 3 indicates the motor signal value. The motor signal value varies depending on the combination of the driving current value and the RPM of the motor 60. A solid line plotted on the graph indicates the first correspondence in the case where the image forming apparatus 1 operates in the first operation mode. A dotted line plotted on the graph indicates the first correspondence in the case where the image forming apparatus 1 operates in the second operation mode.

As shown in FIG. 3, the motor signal value corresponding to the driving current value indicating the boundary between the normal range and the first abnormal range differs between the case where the image forming apparatus 1 operates in the first operation mode and the case where the image forming apparatus 1 operates in the second operation mode. In the example shown in FIG. 3, the motor signal value corresponding to the driving current value indicating the boundary in the case where the image forming apparatus 1 operates in the first operation mode is larger than the motor signal value corresponding to the driving current value indicating the boundary in the case where the image forming apparatus 1 operates in the second operation mode. In FIG. 3, the motor signal value corresponding to the driving current value indicating the boundary in the case where the image forming apparatus 1 operates in the first operation mode is shown by a threshold value 72TH. In FIG. 3, the motor signal value corresponding to the driving current value indicating the boundary in the case where the image forming apparatus 1 operates in the second operation mode is shown by a threshold value 74. Meanwhile, in the example, the motor signal value corresponding to the driving current value indicating the boundary in the case where the image forming apparatus 1 operates in the second operation mode is smaller than the motor signal value corresponding to the driving current value indicating the boundary in the case where the image forming apparatus 1 operates in the second operation mode. In FIG. 3, the motor signal value corresponding to the driving current value indicating the boundary in the case where the image forming apparatus 1 operates in the first operation mode is shown by a threshold value 71TH. In FIG. 3, the motor signal value corresponding to the driving current value indicating the boundary in the case where the image forming apparatus 1 operates in the second operation mode is shown by a threshold value 73TH. For convenience of description, the range from the threshold value 71TH to the threshold value 72TH will be described as the first range. For convenience of description, the range from the threshold value 73TH to the threshold value 74 will be described as the second range. The second range is a range in which at least one of the upper limit value (the threshold value 73TH) or the lower limit value (the threshold value 72TH) differs from the upper limit value (threshold value 74TH) or the lower limit value (the threshold value 71TH) of the first range. In the example shown in FIG. 3, both the upper limit value and the lower limit value of the second range differ from the upper limit value and the lower limit value of the first range.

(Processing of First Operation and Second Operation Among Operations of Image Forming Apparatus)

The processing of the first operation and the second operation among the operations of the image forming apparatus 1 will be described.

The first operation is an operation including an operation relating to the fact that the motor signal value has fallen out of the first range, among the operations performed by the image forming apparatus 1 in the first operation mode. For example, the first operation includes an operation of outputting notification information to an information processing apparatus 15 communicably connected to the image forming apparatus 1. This notification information includes, for example, information indicating that the motor signal value has fallen out of the first range, information indicating that an error has occurred in the fixing device 51, and the like. For example, the first operation includes an operation of stopping forming an image on a printing medium. For example, the first operation includes an operation of stopping the driving of the fixing device 51. The first operation may include another operation instead of some or all of these operations or in addition to all the operations.

The second operation is an operation including an operation relating to the fact that the motor signal value has fallen out of the second range, among the operations performed by the image forming apparatus 1 in the second operation mode. For example, the second operation includes an operation of outputting notification information to the information processing apparatus 15 communicably connected to the image forming apparatus 1. This notification information includes, for example, information indicating that the motor signal value has fallen out of the second range, information indicating that an error has occurred in the fixing device 51, and the like. For example, the second operation includes an operation of stopping forming an image on a printing medium. For example, the second operation includes an operation of stopping the driving of the fixing device 51. The second operation may include another operation instead of some or all of these operations or in addition to all the operations. Some of all of one or more operations included in the second operation may be the same as or different from the one or more operations included in the first operation.

Figure 4:
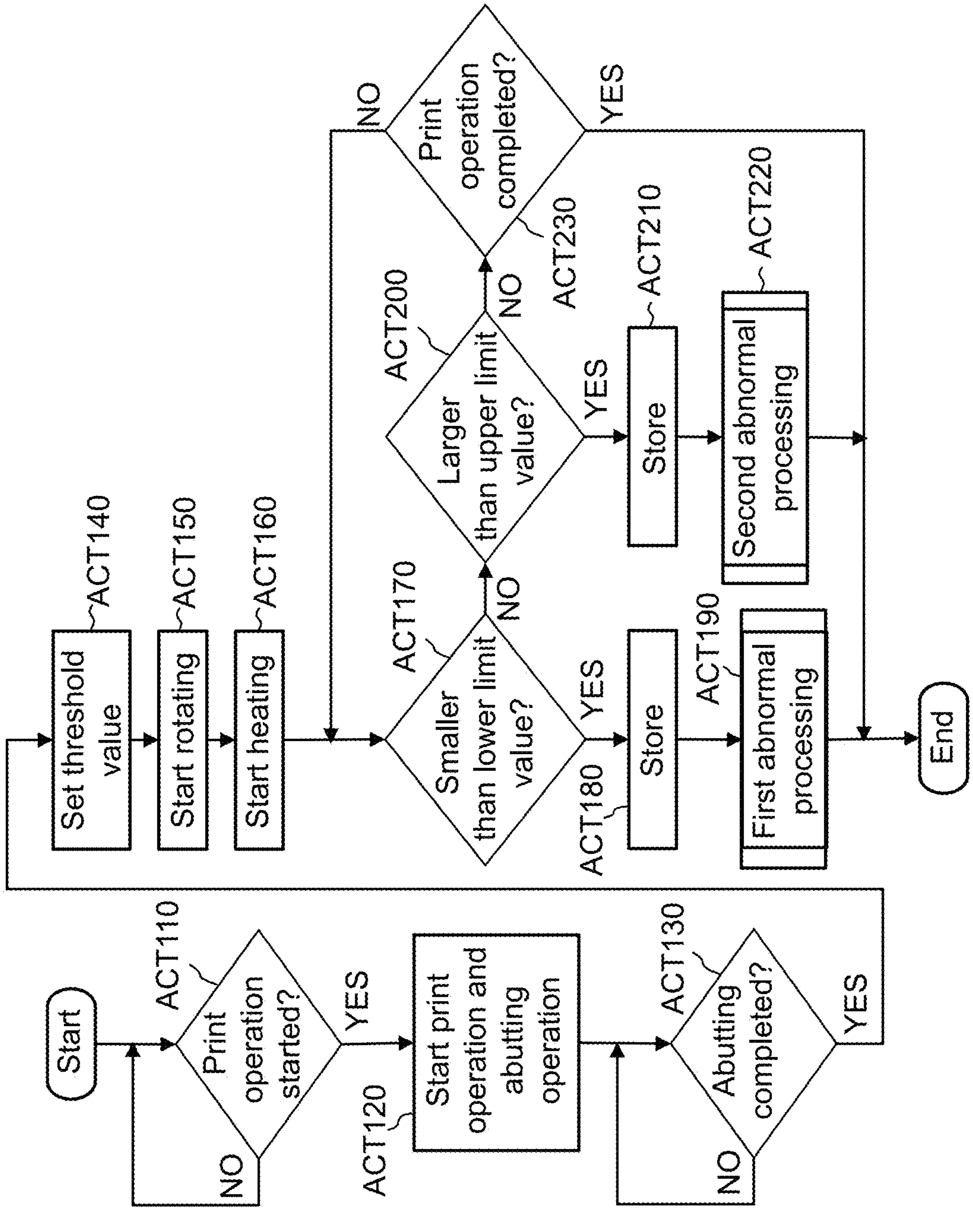
FIG. 4 is a flowchart showing an example of processing of a first operation or second operation performed by a controller according to the embodiment.

FIG. 4 is a flowchart showing an example of processing of the first operation or second operation among the operations performed by the image forming apparatus 1. For convenience of description, an image formed on a printing medium by the image forming apparatus 1 will be described as the target image.

In ACT110 of FIG. 4, the controller 100 stands by until a print operation is started. For example, the controller 100 determines, in the case of receiving a print job, that a print operation is to be started. In this case, the print job includes information indicating the tyke of a printing medium on which a target image is to be formed. In the embodiment, the print operation represents an operation including transporting a printing medium and forming a target image on the printing medium among the operations performed by the image forming apparatus 1. In the flowchart shown in FIG. 4, description of the processing of the print operation among the operations performed by the image forming apparatus 1 will be omitted.

In the case where the controller 100 determines that a print operation is to be started (ACT110—YES), the processing of the controller 100 proceeds to ACT120. In ACT120, the controller 100 specifies, on the basis of the information included in the print job, the type of a printing medium on which a target image is to be formed. Further, after specifying the type, the controller 100 sets the operation mode of the image forming apparatus 1 to the operation mode corresponding to the specified type. After setting the operation mode of the image forming apparatus 1, the controller 100 starts the print operation and the abutting operation. The abutting operation is an operation of causing the pressing member 53 to abut against the outer peripheral surface of the fixing member 52 in the fixing device 51, among the operations performed by the image forming apparatus 1. In ACT120, the controller 100 controls the pressing adjustment mechanism 54 to start the abutting operation.

Next, in ACT130, the controller 100 determines whether or not the started abutting operation described above (see ACT120 described above) has been completed. The controller 100 stands by until the started abutting operation is completed (ACT130—NO). For example, the controller 100 determines, in the case where the pressing force matches with a predetermined force, the abutting operation has been completed. For example, the controller 100 may be configured to detect the pressing force by a pressure sensor or the position of the pressing member 53, or by another method.

In the case where the controller 100 determines that the started abutting operation described above (see ACT120 described above) has been completed (ACT130—YES), the processing of the controller 100 proceeds to ACT140. In ACT140, the controller 100 sets a threshold value (ACT140). Specifically, in ACT140, the controller 100 sets the threshold value corresponding to the current operation mode of the image forming apparatus 1 as a threshold value for the motor signal value. For example, in the case where the current operation mode of the image forming apparatus 1 is the first operation mode, the controller 100 sets the threshold value 71TH that is the upper limit value of the first range and the threshold value 72TH that is the lower limit value of the first range as threshold values for the motor signal value. As a result, the controller 100 is capable of determining whether or not the motor signal value has fallen out of the first range that is the range from the threshold value 71TH to the threshold value 72TH. For example, in the case where the current operation mode of the image forming apparatus 1 is the second operation mode, the controller 100 sets the threshold value 73TH that is the upper limit value of the second range and the threshold value 74 that is the lower limit value of the second range as threshold values for the motor signal value. As a result, the controller 100 is capable of determining whether or not the motor signal value has fallen out of the second range that is the range from the threshold value 73TH to the threshold value 74.

Next, in ACT150, the controller 100 drives the motor 60 at the RPM corresponding to the current operation mode of the image forming apparatus 1 to cause a pressing member 73 to start rotating. In other words, in ACT150, the controller 100 causes the fixing device 51 to start driving. For example, in ACT150, the controller 100 drives, in the case where the current operation mode of the image forming apparatus 1 is the first operation mode, the motor 60 at 1500 rpm. For example, in ACT150, the controller 100 drives, in the case where the current operation mode of the image forming apparatus 1 is the second operation mode, the motor 60 at 940 rpm.

Next, in ACT160, the controller 100 controls the heat source of the heater 56 to start heating the fixing member 52.

Next, in ACT170, the controller 100 acquires the motor signal and determines whether or not the motor signal value of the acquired motor signal is smaller than the set lower limit value described above (see ACT140 described above). The lower limit value represents a threshold value having a smaller value of the threshold values set by the controller 100 in ACT140.

In the case where the controller 100 determines that the motor signal value of the obtained motor signal described above is smaller than the set lower limit value described above (see ACT140 described above) (ACT170—YES), the processing of the controller 100 proceeds to ACT180. In ACT180, the controller 100 stores the abutting failure information in the storage device 1102. The abutting failure information represents information including information indicating that an abutting failure has occurred between the fixing member 52 and the pressing member 53 in the fixing device 51 driven by the motor 60. The abutting failure information may include other information in addition to the information indicating that an abutting failure has occurred between the fixing member 52 and the pressing member 53 in the fixing device 51 driven by the motor 60.

Next, in ACT190, the controller 100 performs first abnormal processing. The first abnormal processing represents processing of performing a 11 operation or a 12 operation as an operation corresponding to the current operation mode of the image forming apparatus 1. The 11 operation represents the first operation in the first abnormal processing performed by the image forming apparatus 1 operating in the first operation mode. The 12 operation represents the second operation in the first abnormal processing performed by the image forming apparatus 1 operating in the second operation mode. The flow of the processing in the first abnormal processing performed by the image forming apparatus 1 will be described below. After performing the first abnormal processing, the controller 100 ends the processing shown in FIG. 4.

Meanwhile, in the case where the controller 100 determines that the motor signal value of the acquired motor signal described above is equal to or larger than the set lower limit value described above (see ACT140 described above) (ACT170—NO), the processing of the controller 100 proceeds to ACT200. In ACT200, the controller 100 determines whether or not the motor signal value of the acquired motor signal described above is larger than the set upper limit value described above (see ACT140 described above). The upper limit value represents a threshold value having a lager value of the threshold values set by the controller 100 in ACT140.

In the case where the controller 100 determines that the motor signal value of the acquired motor signal described above is larger than the upper limit value set in ACT140

(ACT200—YES), the processing of the controller 100 proceeds to ACT210. In ACT210, the controller 100 stores lubricant depletion information in the storage device 1102. The lubricant depletion information represents information including information indicating that depletion of the lubricant in the fixing member 52 has occurred in the fixing device 51 driven by the motor 60. The lubricant depletion information may include other information in addition to the information indicating that depletion of the lubricant in the fixing member 52 has occurred in the fixing device 51 driven by the motor 60.

Next, in ACT220, the controller 100 performs second abnormal processing. The second abnormal processing represents processing of performing a 21 operation or a 22 operation as the operation corresponding to the current operation mode of the image forming apparatus 1. The 21 operation represents the first operation in the second abnormal processing performed by the image forming apparatus 1 operating in the first operation mode. The 22 operation represents the second operation in the second abnormal processing performed by the image forming apparatus 1 operating in the second operation mode. The processing in the second abnormal processing performed by the image forming apparatus 1 will be described below. After performing the second abnormal processing, the controller 100 ends the processing shown in FIG. 4.

Meanwhile, in the case where the controller 100 determines that the motor signal value of the acquired motor signal described above is equal to or less than the set upper limit value described above (see ACT140 described above) (ACT200—NO), the processing of the controller 100 proceeds to ACT230. In ACT230, the controller 100 determines whether or not the started print operation described above (see ACT120 described above) has been completed. For example, the controller 100 determines, in the case of acquiring, from the third detector 43, information indicating that a printing medium has been discharged to the discharge tray 64, the print operation has been completed. Meanwhile, for example, the controller 100 determines, in the case where information indicating that a printing medium has been discharged to the discharge tray 64 has not been acquired from the third detector 43, that the print operation has not been completed. The controller 100 may determine whether or not the print operation has been completed by another method.

In the case where the controller 100 determines that the started print operation described above (see ACT120 described above) has not been completed (ACT230—NO), the processing of the controller 100 returns to ACT170. In ACT170, the controller 100 acquires the motor signal and determines whether or not the motor signal value of the acquired motor signal is smaller than the set lower limit value described above (see ACT140 described above) again.

Meanwhile, in the case where the controller 100 determines that the started print operation described above (see ACT120 described above) has been completed (ACT230—YES), the controller 100 ends the processing shown in FIG. 4.

(First Abnormal Processing)

Figure 5:
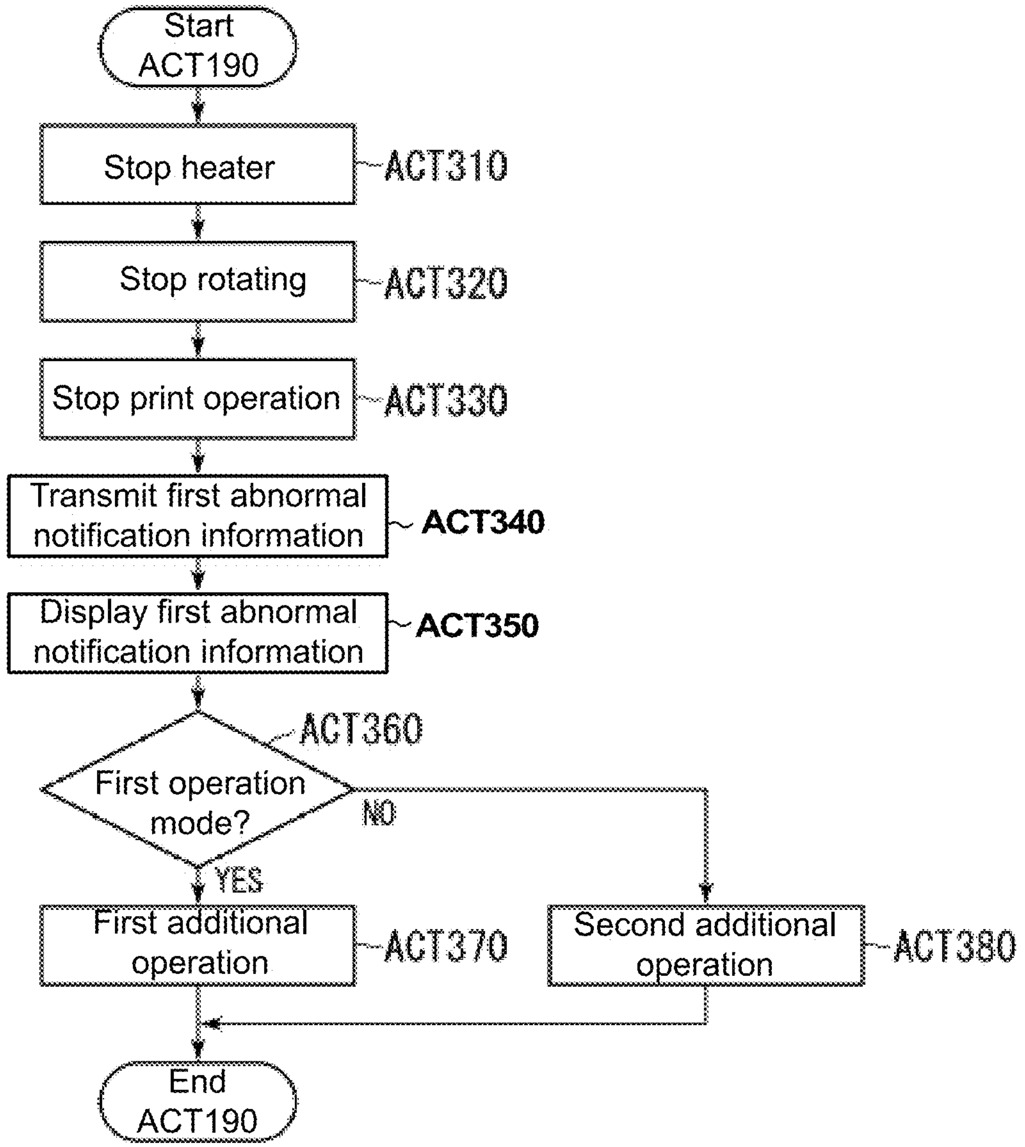
FIG. 5 is a flowchart showing an example of first abnormal processing performed by the controller according to the embodiment.

The first abnormal processing will be described. FIG. 5 is a diagram showing an example of the first abnormal processing performed by the controller 100 in ACT190 shown in FIG. 4. The operation of the image forming apparatus 1 performed by the processing of ACT310, ACT320, ACT330, ACT340, ACT350, and ACT370 shown in FIG. 5 is an example of the 11 operation. The operation of the image forming apparatus 1 performed by the processing of ACT310, ACT320, ACT330, ACT340, ACT350, and ACT380 shown in FIG. 5 is an example of the 12 operation. That is, the operation of the image forming apparatus 1 performed by the processing of ACT310, ACT320, ACT330, ACT340, and ACT350 shown in FIG. 5 is a common operation in both the 11 operation and the 12 operation.

In ACT310 of FIG. 5, the controller 100 controls the heat source of the heater 56 to stop heating the fixing member 52.

Next, in ACT320, the controller 100 controls the motor 60 to stop rotating the pressing member 53.

Next, in ACT330, the controller 100 stops the print operation started in ACT120 shown in FIG. 4.

Next, in ACT340, the controller 100 transmits first abnormal notification information. The first abnormal notification information is, for example, information including the abutting failure information. The first abnormal notification information may be information including information indicating that the motor signal value has fallen out of the first range, instead of or in addition to the abutting failure information. The first abnormal notification information may include other information in addition to one or both of the two pieces of information. In ACT340, the destination to which the controller 100 transmits the first abnormal notification information is the information processing apparatus 15 communicably connected to the image forming apparatus 1 or the like. The information processing apparatus 15 includes, but not limited to, a personal computer (PC) of a company that performs maintenance of the image forming apparatus 1, an information processing terminal of an administrator who manages the image forming apparatus 1, or the like. The information processing terminal include, but not limited to, a multi-functional mobile phone terminal (smartphone), a mobile phone terminal, a tablet PC, a notebook PC, a PDA (Personal Digital Assistant), a desktop PC, or the like. The first abnormal notification information is an example of the above-mentioned notification information.

Next, in ACT350, the controller 100 displays the first abnormal notification information. In ACT350, the display destination where the controller 100 displays the first abnormal notification information is a display device of the control panel 12, a display device of the information processing apparatus 15 communicably connected to the image forming apparatus 1, or the like. The information processing apparatus 15 includes, but not limited to, a PC of a company that performs maintenance of the image forming apparatus 1, an information processing terminal of an administrator who manages the image forming apparatus 1, or the like.

Next, in ACT360, the controller 100 determines whether or not the current operation mode of the image forming apparatus 1 is the first operation mode.

In the case where the controller 100 determines that the current operation mode of the image forming apparatus 1 is the first operation mode (ACT360—YES), the processing of the controller 100 proceeds to ACT370. In ACT370, the controller 100 performs a first additional operation. The first additional operation may be an arbitrary operation as long as it can be additionally performed by the image forming apparatus 1 operating in the first operation mode in addition to the operation of the image forming apparatus 1 performed by the processing of ACT310, ACT320, ACT330, ACT340, and ACT350 shown in FIG. 5. After performing the processing of ACT370, the controller 100 ends the processing shown in FIG. 5.

Meanwhile, in the case where the controller 100 determines that the current operation mode of the image forming apparatus 1 is the second operation mode (ACT360—NO), the processing of the controller 100 proceeds to ACT380. In ACT380, the controller 100 performs a second additional operation. The second additional operation may be an arbitrary operation as long as it can be additionally performed by the image forming apparatus 1 operating in the second operation mode in addition to the operation of the image forming apparatus 1 performed by the processing of ACT310, ACT320, ACT330, ACT340, and ACT350 shown in FIG. 5. After performing the processing of ACT380, the controller 100 ends the processing shown in FIG. 5.

In the flowchart shown in FIG. 5, part of the processing of ACT310, ACT320, ACT330, ACT340, ACT350, ACT370, and ACT380 may be omitted. In the 11 operation, part of the processing of ACT310, ACT320, ACT330, ACT340, ACT350, and ACT370 may be omitted. In the 12 operation, part of the processing of ACT310, ACT320, ACT330, ACT340, ACT350, and ACT380 may be omitted.

In the flowchart shown in FIG. 5, some or all of the processing of ACT310, ACT320, ACT330, ACT340, ACT350, and ACT360 may be performed in another order or in parallel. However, the processing of each of ACT370 and ACT380 is performed after ACT360.

(Second Abnormal Processing)

Figure 6:
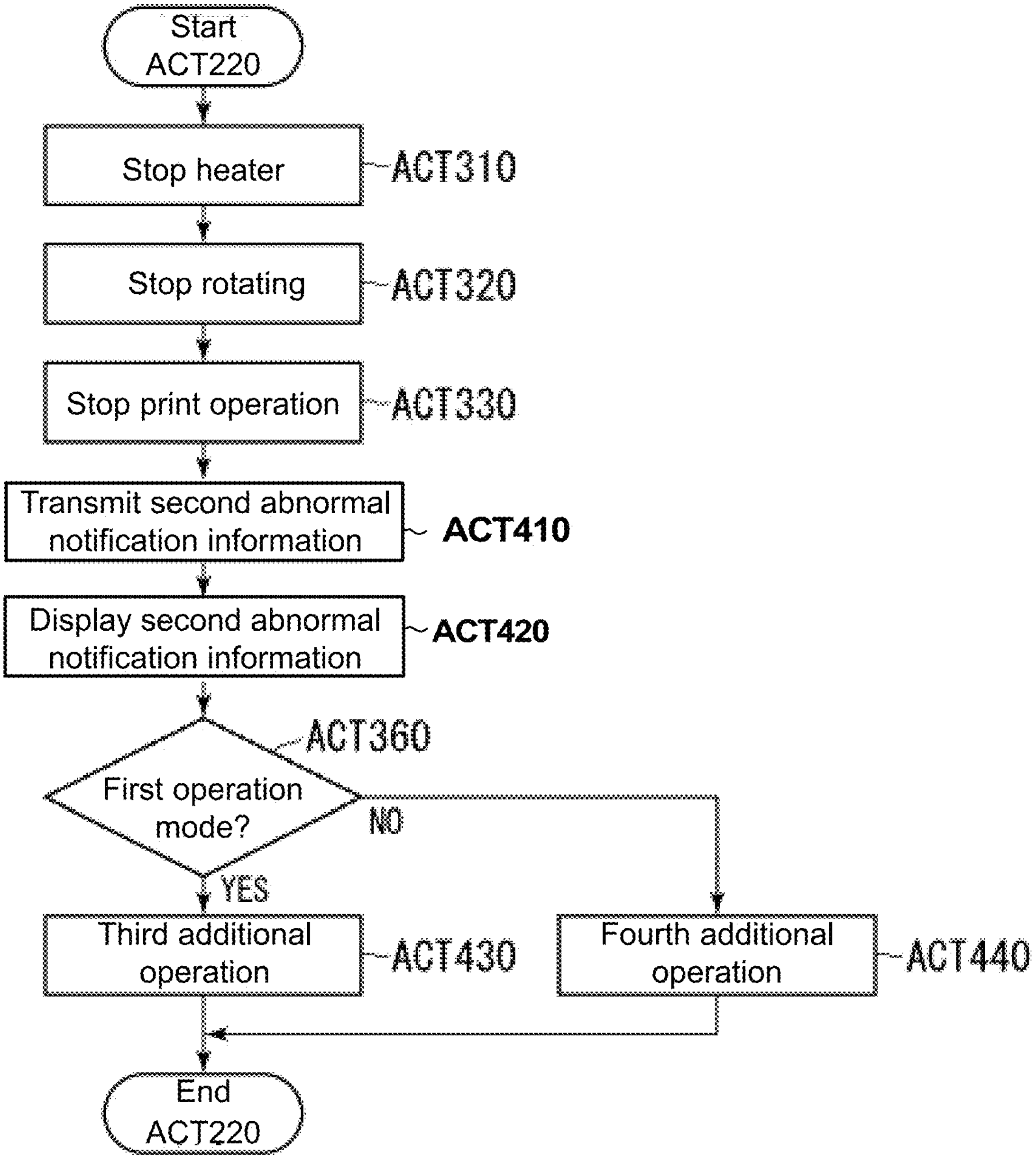
FIG. 6 is a flowchart showing an example of second abnormal processing performed by the controller according to the embodiment.

The second abnormal processing will be described. FIG. 6 is a diagram showing an example of the second abnormal processing performed by the controller 100 in ACT220 shown in FIG. 4. Since the processing of ACT310, ACT320, ACT330, and ACT360 shown in FIG. 6 is similar to the processing of ACT310, ACT320, ACT330, ACT360 shown in FIG. 5, respectively, description thereof is omitted. The operation of the image forming apparatus 1 performed by the processing of ACT310, ACT320, ACT330, ACT410, ACT420, and ACT430 shown in FIG. 6 is an example of the 21 operation. The operation of the image forming apparatus 1 performed by the processing of ACT310, ACT320, ACT330, ACT410, ACT420, and ACT440 shown in FIG. 6 is an example of the 22 operation. That is, the operation of the image forming apparatus 1 performed by the processing of ACT310, ACT320, ACT330, ACT410, and ACT420 shown in FIG. 6 is a common operation in both the 21 operation and the 22 operation.

After performing the processing of ACT330 shown in FIG. 6, the controller 100 transmits second abnormal notification information in ACT410. The second abnormal notification information is, for example, information including the lubricant depletion information. The second abnormal notification information may be information including information indicating that the motor signal value has fallen out of the second range instead of or in addition to the lubricant depletion information. The second abnormal notification information may include other information one or both of the two pieces of information. In ACT410, the destination to which the controller 100 transmits the second abnormal notification information is the information processing apparatus 15 communicably connected to the image forming apparatus 1 or the like. The information processing apparatus 15 includes, but not limited to, a PC of a company that performs maintenance of the image forming apparatus 1, an information processing terminal of an administrator who manages the image forming apparatus 1, or the like. The second abnormal notification information is an example of the above-mentioned notification information.

Next, in ACT420, the controller 100 displays the second abnormal notification information. In ACT420, the display destination where the controller 100 displays the second abnormal notification information is a display device of the control panel 12, a display device of the information processing apparatus 15 communicably connected to the image forming apparatus 1, or the like. The information processing apparatus 15 includes, but not limited to, a PC of a company that performs maintenance of the image forming apparatus 1, an information processing terminal of an administrator who manages the image forming apparatus 1, or the like.

In ACT360 shown in FIG. 6, the controller 100 determines whether or not the current operation mode of the image forming apparatus 1 is the first operation mode. In the case where the controller 100 determines that the current operation mode of the image forming apparatus 1 is the first operation mode (ACT360—YES), the processing of the controller 100 proceeds to ACT430. In ACT430, the controller 100 performs a third additional operation. The third additional operation may be an arbitrary operation as long as it can be additionally performed by the image forming apparatus 1 operating in the first operation mode in addition to the operation of the image forming apparatus 1 performed by the processing of ACT310, ACT320, ACT330, ACT410, and ACT420 shown in FIG. 6. After performing the processing of ACT430, the controller 100 ends the processing shown in FIG. 6.

Meanwhile, in the case where the controller 100 determines in ACT360 shown in FIG. 6 that the current operation mode of the image forming apparatus 1 is the second operation mode (ACT360—NO), the processing of the controller 100 proceeds to ACT440. In ACT440, the controller 100 performs a fourth additional operation. The fourth additional operation may be an arbitrary operation as long as it can be additionally performed by the image forming apparatus 1 operating in the second operation mode in addition to the operation of the image forming apparatus 1 performed by the processing of ACT310, ACT320, ACT330, ACT410, and ACT420 shown in FIG. 6. After performing the processing of ACT440, the controller 100 ends the processing shown in FIG. 6.

In the flowchart shown in FIG. 6, part of the processing of ACT310, ACT320, ACT330, ACT410, ACT420, ACT430, and ACT440 may be omitted. In the 21 operation, part of the processing of ACT310, ACT320, ACT330, ACT410, ACT420, and ACT430 may be omitted. In the 22 operation, part of the processing of ACT310, ACT320, ACT330, ACT410, ACT420, and ACT440 may be omitted.

In the flowchart shown in FIG. 6, some or all of the processing of ACT310, ACT320, ACT330, ACT410, ACT420, and ACT360 may be performed in another order or in parallel. However, the processing of each of ACT430 and ACT440 is performed after ACT360.

As described above, the image forming apparatus 1 according to the embodiment performs the first operation in the case where the motor signal value has fallen out of the first range while driving the motor 60 in the first operation mode, and performs the second operation in the case where the motor signal value has fallen out of the second range while driving the motor 60 in the second operation mode. As a result, the image forming apparatus 1 is capable of performing, at a desired timing, the operation corresponding to an error that has occurred in the fixing device 51.

Modification 1 of Embodiment

A modification 1 of the embodiment will be described. In the modification 1 of the embodiment, the controller 100 sets a threshold value 81TH, a threshold value 82TH, a threshold value 83TH, and a threshold value 84TH instead of the threshold value 71TH, the threshold value 72TH, the threshold value 73TH, and the threshold value 74TH. The threshold value 81TH is a value smaller than the threshold value 71TH by a predetermined ratio. For example, the threshold value 81TH is a value smaller than the threshold value 71TH by the amount corresponding to the value of 10% of the threshold value 71TH. The threshold value 82TH is a value larger than the threshold value 72TH by a predetermined ratio. for example, the threshold value 82TH is a value larger than the threshold value 72TH by the amount corresponding to the value of 10% of the threshold value 72TH. That is, the first range according to the modification 1 of the embodiment is a range narrower than the first range according to the embodiment and is a range included inside the first range according to the embodiment. For example, the threshold value 83TH is a value smaller than the threshold value 73TH by the amount corresponding to the value of 10% of the threshold value 73TH. The threshold value 84TH is a value larger than the threshold value 74TH by a predetermined ratio. For example, the threshold value 84TH is a value larger than the threshold value 74TH by the amount corresponding to the value of 10% of the threshold value 74TH. That is, the second range according to the modification 1 of the embodiment is a range narrower than the second range according to the embodiment and is a range included inside the second range according to the embodiment.

In the modification 1 of the embodiment, the first abnormal notification information is, for example, information indicating that there is a high possibility that an abutting failure between the fixing member 52 and the pressing member 53 occurs in the fixing device 51 driven by the motor 60, or information indicating that the motor signal value has fallen out of the first range. The first abnormal notification information may include other information in addition to one or both of the two pieces of information. In the modification 1 of the embodiment, in the first abnormal processing, the processing of ACT310, ACT320, and ACT330 is omitted. In the modification 1 of the embodiment, the second abnormal notification information is information including information indicating that there is a high possibility that lubricant depletion in the fixing member 52 occurs in the fixing device 51 driven by the motor 60, information indicating that the motor signal value has fallen out of the first range, and the like. The second abnormal notification information may include other information in addition to one or both of the two pieces of information. In the modification 1 of the embodiment, in the second abnormal processing, the processing of ACT310, ACT320, and ACT330 is omitted. As a result, the image forming apparatus 1 is capable of, for example, notifying that there is a high possibility that an error occurs in the fixing device 51, or displaying that there is a high possibility that an error occurs in the fixing device 51, by the first operation or the second operation before an error occurs in the fixing device 51.

Modification 2 of Embodiment

A modification 2 of the embodiment will be described. In the modification 2 of the embodiment, the controller 100 may be configured to perform the determination processing of ACT170 and ACT200 shown in FIG. 4 using a machine-leaning model. In this case, the threshold value set in ACT140 shown in FIG. 4 may be incorporated into the machine-learning model.

Modification 3 of Embodiment

A modification 3 of the embodiment will be described. In the modification 3 of the embodiment, the controller 100 may be configured to perform the determination processing of ACT170 and ACT200 shown in FIG. 4 on the basis of a detection difference value instead of the motor signal value. The detection difference value represents a difference value between the motor signal value and a reference value used as a predetermined reference. In the case where the processing of ACT170 is performed on the basis of the detection difference value and the operation mode of the image forming apparatus 1 is the first operation mode, the controller 100 determines, in ACT170, whether or not the detection difference value is smaller than the difference value between the threshold value 72TH and the reference value. In the case where the processing of ACT200 is performed on the basis of the detection difference value and the operation mode of the image forming apparatus 1 is the first operation mode, the controller 100 determines, in ACT200, whether or not the detection difference value is larger than the difference value between the threshold value 71TH and the reference value. In the case where the processing of ACT170 is performed on the basis of the detection difference value and the operation mode of the image forming apparatus 1 is the second operation mode, the controller 100 determines, in ACT170, whether or not the detection difference value is smaller than the difference value between the threshold value 74TH and the reference value. In the case where the processing of ACT170 is performed on the basis of the detection difference value and the operation mode of the image forming apparatus 1 is the second operation mode, the controller 100 determines, in ACT200, whether or not the detection difference value is larger than the difference value between the threshold value 73TH and the reference value.

As a result, even in the case where the correspondence between the driving current value and the motor signal value varies depending on the individual difference in the motor 60 for each of a plurality of image forming apparatuses 1, each image forming apparatus 1 is capable of performing, at a desired timing, an operation corresponding to an error that has occurred in the fixing device 51 with high accuracy.

Modification 4 of Embodiment

A modification 4 of the embodiment will be described. In the modification 4 of the embodiment, the difference between the first operation mode and the second operation mode is not the RMP of the motor 60 but the magnitude of the pressing force.

The first operation mode in the modification 4 of the embodiment is an operation mode in which the motor 60 is driven while pressing, in the case where the pressing member 53 is pressed against the fixing member 52 by a biasing member, the pressing member 53 against the fixing member 52 at the pressing force of a first magnitude. In other words, the first operation mode is an operation mode in which the motor 60 is driven while causing the pressing member 53 and the fixing member 52 to be in contact with each other at the pressing force of the first magnitude. For example, the image forming apparatus 1 performs, in the case of forming an image on A4-sized plain paper, an operation of forming an image on the plain paper in the first operation mode. The pressing force of the first magnitude is, for example, 400 N. The pressing force of the first magnitude may be less than 400 N or greater than 400 N.

The second operation mode in the modification 4 of the embodiment is an operation mode in which the motor 60 is driven while pressing, in the case where the pressing member 53 is pressed against the fixing member 52 by a biasing member, the pressing member 53 against the fixing member 52 at the pressing force of a second magnitude. In other words, the second operation mode is an operation mode in which the motor 60 is driven while causing the pressing member 53 and the fixing member 52 to be in contact with each other at the pressing force of the second magnitude. For example, the image forming apparatus 1 performs, in the case of forming an image on A4-sized thick paper, an operation of forming an image on the thick paper in the second operation mode. The pressing force of the second magnitude is, for example, 100 N. The pressing force of the second magnitude may be less than 100 N or greater than 100 N.

Figure 7:
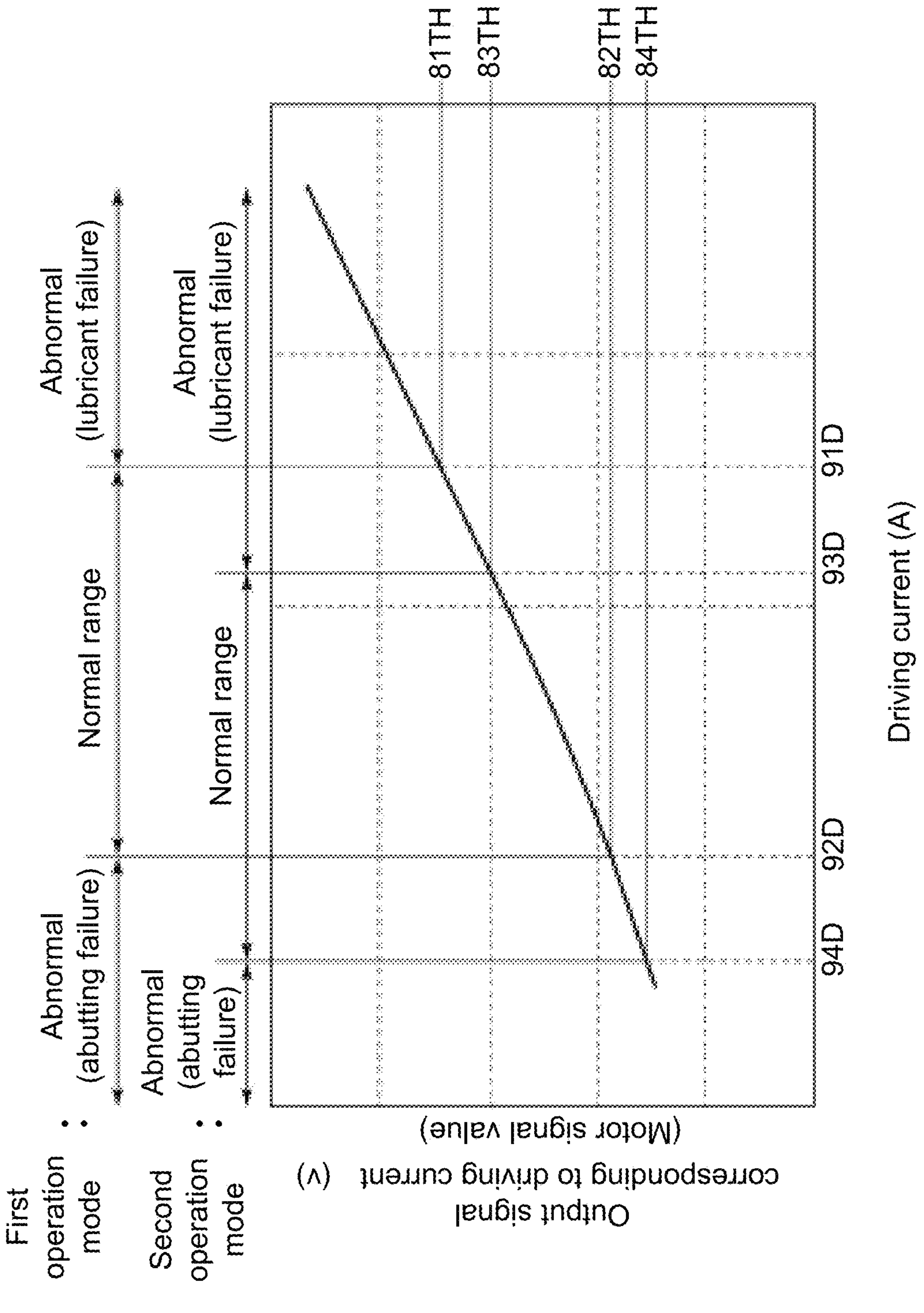
FIG. 7 is a diagram showing an example of a second correspondence between a driving current value of the motor according to the embodiment and a signal value output from the motor.

FIG. 7 is a diagram showing an example of the second correspondence. The second correspondence represents a relationship between the driving current value and the motor signal value in the modification 4 of the embodiment.

The horizontal axis of the graph shown in FIG. 7 indicates the driving current value. The driving current value varies depending on the load of the motor 60. The vertical axis of the graph indicates the motor signal value. A solid line plotted on the graph indicates the second correspondence in the case where the image forming apparatus 1 operates in the first operation mode and the second operation mode.

For example, in the case where the operation mode of the image forming apparatus 1 is the first operation mode and the fixing device 51 driven by the motor 60 normally operates, the driving current value indicates a value within the normal range from a value 91D to a value 92D shown in FIG. 7. For example, in the case where the operation mode of the image forming apparatus 1 is the first operation mode and an abutting failure between the fixing member 52 and the pressing member 53 has occurred in the fixing device 51 driven by the motor 60, the driving current value indicates a value smaller than the value 92D shown in FIG. 7. For example, the operation mode of the image forming apparatus 1 is the first operation mode and lubricant depletion in the fixing member 52 has occurred in the fixing device 51 driven by the motor 60, the driving current value indicates a value larger than the value 91D shown in FIG. 7.

For example, in the case where the operation mode of the image forming apparatus 1 is the second operation mode and the fixing device 51 driven by the motor 60 normally operates, the driving current value indicates a value within the normal range from a value 93D to a value 94D shown in FIG. 7. For example, in the case where the operation mode of the image forming apparatus 1 is the second operation mode and an abutting failure between the fixing member 52 and the pressing member 53 has occurred in the fixing device 51 driven by the motor 60, the driving current value indicates a value smaller than the value 94D shown in FIG. 7. For example, in the case where the operation mode of the image forming apparatus 1 is the second operation mode and lubricant depletion in the fixing member 52 has occurred in the fixing device 51 driven by the motor 60, the driving current value indicates a value larger than the value 93D shown in FIG. 7.

The threshold value 81TH shown in FIG. 7 indicates the motor signal value in the case where the driving current value is the value 91D. The threshold value 82TH shown in FIG. 7 indicates the motor signal value in the case where the driving current value is the value 92D. The threshold value 83TH shown in FIG. 7 indicates the motor signal value in the case where the driving current value is the value 93D. The threshold value 84TH shown in FIG. 7 indicates the motor signal value in the case where the driving current value is the value 94D. For convenience of description, the range from the threshold value 81TH to the threshold value 82TH will be described as the third range. The third range is a modification of the first range in the embodiment. For convenience of description, the range from the threshold value 83TH to the threshold value 84TH will be described as the fourth range. The fourth range is a modification of the second range in the embodiment.

The fourth range is a range in which at least one of the upper limit value or the lower limit value is different from that of the third range. In the example shown in FIG. 7, in the fourth range, both the upper limit value and the lower limit value are different from those of the third range. For this reason, in the case where the operation mode of the image forming apparatus 1 is the first operation mode, the controller 100 is capable of determining whether or not the motor signal value has fallen out of the third range using the threshold value 81TH and the threshold value 82TH. In the case where the operation mode of the image forming apparatus 1 is the second operation mode, the controller 100 is capable of determining whether or not the motor signal value has fallen out of the fourth range using the threshold value 83TH and the threshold value 84TH.

Figure 8:
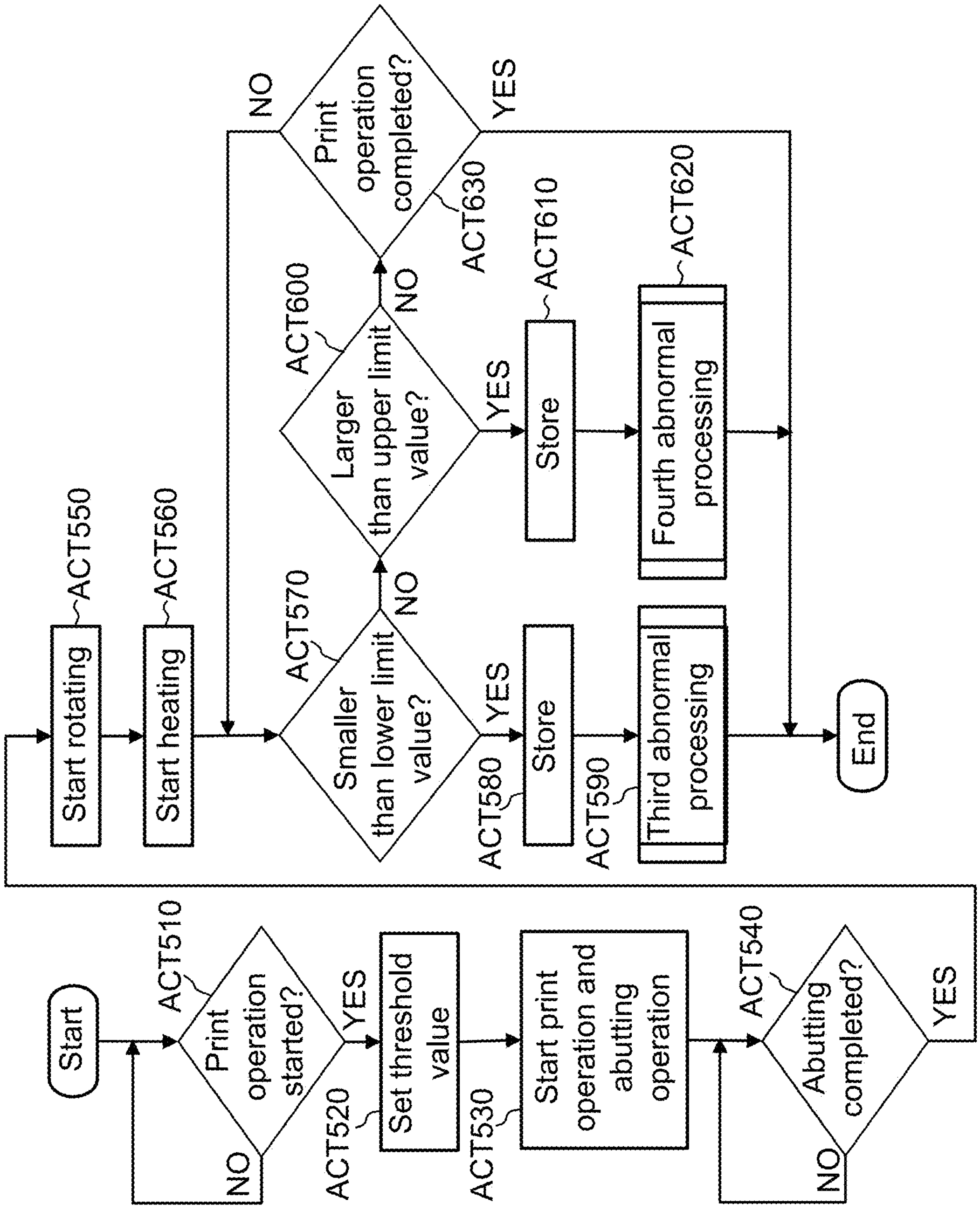
FIG. 8 is a flowchart showing an example of processing of a first operation or second operation performed by a controller according to a modification of the embodiment.

FIG. 8 is a diagram showing an example of the processing of the first operation or second operation among the operations performed by the image forming apparatus 1 according to the modification 4 of the embodiment.

In ACT510 of FIG. 8, the controller 100 stands by until a print operation is started. For example, the controller 100 determines, in the case of receiving a print job, that a print operation is to be started. In this case, the print job includes information indicating the tyke of a printing medium on which an image is to be formed. In the modification 4 of the embodiment, the print operation represents an operation including transporting a printing medium and forming an image on the printing medium among the operations performed by the image forming apparatus 1. In the flowchart shown in FIG. 8, description of the processing of performing a print operation among the operations performed by the image forming apparatus 1 will be omitted.

In the case where the controller 100 determines that a print operation is to be started (ACT510—YES), the processing of the controller 100 proceeds to ACT520. In ACT520, the controller 100 sets a threshold value. More specifically, in ACT520, the controller 100 specifies, on the basis of the received print job described above (see ACT510 described above), the type of a printing medium on which an image is to be formed. The controller 100 switches the operation mode in accordance with the specified type. For example, in ACT520, the controller 100 sets, in the case where the specified type is A4-sized plain paper, the operation mode of the image forming apparatus 1 to the first operation mode. For example, in ACT520, the controller 100 sets, in the case where the specified type is A4-sized thick paper, the operation mode of the image forming apparatus 1 to the second operation mode. The controller 100 sets the operation mode to one of the first operation mode and the second operation mode, and then, sets the threshold value corresponding to the current operation mode of the image forming apparatus 1 as a threshold value for the motor signal value. For example, the controller 100 sets, in the case where the current operation mode of the image forming apparatus 1 is the first operation mode, the threshold value 81TH that is the upper limit value of the first range and the threshold value 82TH that is the lower limit value of the first range as threshold values for the motor signal value. As a result, the controller 100 is capable of determining whether or not the motor signal value has fallen out of the third range that is a range from the threshold value 81TH to the threshold value 82TH. For example, the controller 100 sets, in the case where the current operation mode of the image forming apparatus 1 is the second operation mode, the threshold value 83TH that is the upper limit value of the fourth range and the threshold value 84TH that is the lower limit value of the fourth range as threshold values for the motor signal value. As a result, the controller 100 is capable of determining whether or not the motor signal value has fallen out of the fourth range that is a range from the threshold value 83TH to the threshold value 84TH.

Next, in ACT530, the controller 100 starts the print operation and the abutting operation. At this time, the controller 100 controls the pressing adjustment mechanism 54 to start causing the pressing member 53 to abut against the outer peripheral surface of the fixing member 52 at the pressing force corresponding to the current operation mode of the image forming apparatus 1.

Next, in ACT540, the controller 100 stands by until the started abutting operation described above (see ACT530 described above) is completed. Since the processing of ACT540 is similar to the processing of ACT130 shown in FIG. 4, detailed description thereof is omitted.

In the case where the controller 100 determines that the started abutting operation described above (see ACT540 described above) has been completed (ACT540—YES), the processing of the controller 100 proceeds to ACT550. In ACT550, the controller 100 drives the motor 60 at the predetermined RPM to cause the pressing member 73 to start rotating. In other words, in ACT550, the controller 100 starts driving the fixing device 51. For example, in ACT550, the controller 100 drives the motor 60 at 1500 rpm.

Next, in ACT560, the controller 100 controls the heat source of the heater 56 to start heating the fixing member 52.

Next, in ACT570, the controller 100 acquires the motor signal and determines whether or not the motor signal value of the acquired motor signal is smaller than the set lower limit value described above (see ACT520 described above). The lower limit value represents a threshold value having a smaller value of the threshold values set by the controller 100 in ACT520.

In the case where the controller 100 determines that the motor signal value of the acquired motor signal described above is smaller than the lower limit value set in ACT520 (ACT570—YES), the processing of the controller 100 proceeds to ACT580. In ACT580, the controller 100 stores the abutting failure information in the storage device 1102.

Next, in ACT590, the controller 100 performs third abnormal processing. The third abnormal processing represents processing of performing a 31 operation or a 32 operation as the operation corresponding to the current operation mode of the image forming apparatus 1. The 31 operation represents the first operation in the third abnormal processing performed by the image forming apparatus 1 operating in the first operation mode. That is, the 31 operation is a modification of the 11 operation according to the embodiment. The 32 operation represents the second operation in the third abnormal processing performed by the image forming apparatus 1 operating in the second operation mode. That is, the 32 operation is a modification of the 12 operation according to the embodiment. Since the flow of the processing in the third abnormal processing performed by the image forming apparatus 1 is similar to that of the first abnormal processing, detailed description thereof is omitted. However, in the third abnormal processing, in ACT340 and ACT350, third abnormal notification information is used instead of the first abnormal notification information. The third abnormal notification information is, for example, information including the abutting failure information. The third abnormal notification information may be information including information indicating that the motor signal value has fallen out of the third range instead of or in addition to the abutting failure information. The third abnormal notification information may include other information in addition to one or both of the two pieces of information. After performing the third abnormal processing, the controller 100 ends the processing shown in FIG. 8.

Meanwhile, in the case where the controller 100 determines that the motor signal value of the acquired motor signal is equal to or larger than the lower limit value set in ACT520 (ACT570—NO), the processing of the controller 100 proceeds to ACT600. In ACT600, the controller 100 determines whether or not the motor signal value of the acquired motor signal described above is larger than the upper limit value set in ACT520. The upper limit value represents a threshold value having a larger value of the threshold values set by the controller 100 in ACT520.

In the case where the controller 100 determines that the motor signal value of the acquired motor signal is larger than the upper limit value set in ACT520 (ACT600—YES), the processing of the controller 100 proceeds to ACT610. In ACT610, the controller 100 stores the lubricant depletion information in the storage device 1102.

Next, in ACT620, the controller 100 performs fourth abnormal processing. The fourth abnormal processing represents processing of performing a 41 operation or a 42 operation as the operation corresponding to the current operation mode of the image forming apparatus 1. The 41 operation represents the first operation in the fourth abnormal processing performed by the image forming apparatus 1 operating in the first operation mode. That is, the 41 operation is a modification of the 21 operation according to the embodiment. The 42 operation is the second operation in the fourth abnormal processing performed by the image forming apparatus 1 operating in the second operation mode. That is, the 42 operation is a modification of the 22 operation according to the embodiment. Since the flow of the processing in the fourth abnormal processing performed by the image forming apparatus 1 is similar to that of the second abnormal processing, detailed description thereof is omitted. However, in the fourth abnormal processing, in ACT340 and ACT350, fourth abnormal notification information is used instead of the second abnormal notification information. The fourth abnormal notification information is, for example, information including the lubricant depletion information. The fourth abnormal notification information may be information including information indicating that the motor signal value has fallen out of the fourth range instead of or in addition to the lubricant depletion information. The fourth abnormal notification information may include other information in addition to one or both of the two pieces of information. After performing the fourth abnormal processing, the controller 100 ends the processing shown in FIG. 8.

Meanwhile, in the case where the controller 100 determines that the motor signal value of the acquired motor signal is equal to or smaller than the upper limit value set in ACT520 (ACT600—NO), the processing of the controller 100 proceeds to ACT630. In ACT630, the started print operation described above (see ACT530 described above) has been completed is determined. Since the processing of ACT630 is similar to the processing of ACT230 shown in FIG. 4, detailed description thereof is omitted.

In the case where the controller 100 determines that the print operation started in ACT530 has not been completed (ACT630—NO), the processing of the controller 100 returns to ACT570. In ACT570, the controller 100 acquires the motor signal and determines whether or not the motor signal value of the acquired motor signal is smaller than the set lower limit value described above (see ACT520) again.

Meanwhile, in the case where the controller 100 determines that the print operation started in ACT530 has been completed (ACT630—YES), the controller 100 ends the processing shown in FIG. 4.

As described above, the image forming apparatus 1 according to the modification 4 of the embodiment performs the first operation n the case where the motor signal value has fallen out of the third range while driving the motor 60 in the first operation mode. Further, the image forming apparatus 1 performs the second operation in the case where the motor signal value has fallen out of the fourth range while driving the motor 60 in the second operation mode. As a result, the image forming apparatus 1 is capable of performing, at a desired timing, the operation corresponding to an error that has occurred in the fixing device 51.

Other Modifications

In the embodiment or modifications of the embodiment described above, the difference between the first operation mode and the second operation mode may be the pressure of the nip formed by the fixing member 52 and the pressing member 53 in the fixing device 51.

In the embodiment or modifications of the embodiment described above, the difference between the first operation mode and the second operation mode may be the pressure of the nip formed by the fixing member 52 and the pressing member 53 in the fixing device 51. This is because the load of the motor 60 also changes depending on the difference in the pressure of the nip.

In the embodiment or modifications of the embodiment described above, the difference between the first operation mode and the second operation mode may be the heating target temperature of the fixing member 52 by the heater 56. This is because the viscosity of the lubricant changes due to changes in the temperature of the fixing member 52, and as a result, the load of the motor 60 changes.

The embodiment and modifications of the embodiment described above may be combined in an arbitrary manner.

As described above, an image forming apparatus (the image forming apparatus 1 described above) includes: a transport device; an image forming device (the image forming device 114 described above); a fixing device (the fixing device 51 described above); a motor (the motor 60 described above); and a controller (the controller 100 in the example described above). In the example described above, the transport device includes the secondary transfer roller 23, the two resist rollers 24, the fixing device 51, various rollers in the double-sided printing device 55, and the like. The transport device transports a printing medium. The image forming device forms a toner image of a target image on the printing medium transported by the transport device. The fixing device heats the printing medium after the toner image is formed by the image forming device, and fixes the toner image to the printing medium as the target image. The motor drives the fixing device and outputs a signal (the motor signal described above) having a magnitude value (the motor signal value described above) corresponding to a value of a driving current of the motor (the driving current value described above). The controller performs a first operation where the magnitude value of the signal has fallen out of a first range (the first range and the third range described above) while driving the motor in the first operation mode. The controller performs a second operation where the magnitude value of the signal has fallen out of a second range (the second range and the fourth range described above) while driving the motor in the second operation mode, the magnitude value of the signal in the second range being different from that of the first range. As a result, the image forming apparatus is capable of performing, at a desired timing, an operation corresponding to an error that has occurred in the fixing device.

In the image forming apparatus, the second range may be different from the first range in at least one of the upper limit value or the lower limit value.

In the image forming apparatus, the first operation mode may be an operation mode in which the motor is driven by the first RPM (1500 rpm in the example described above) and the second operation mode may be an operation mode in which the motor is driven by the second RPM (940 rpm in the example described above) different from the first RPM.

In the image forming apparatus, the fixing device includes a heater (the heater 56 described above), a fixing member heated by the heater (the fixing member 52 described above), and a pressing member (the pressing member 53 described above). The first operation mode may be an operation mode in which the motor is driven while causing the pressing member and the fixing member to be in contact with each other by a first force (the pressing force of the first magnitude described above, i.e., 400 N). The second operation mode may be an operation mode in which the motor is driven while causing the pressing member and the fixing member to be in contact with each other by a second force (the pressing force of the second magnitude described above, i.e., 100 N) different from the first force.

In the image forming apparatus, the first operation and the second operation may include an operation of outputting, to the information processing apparatus, notification information (each of the first abnormal notification information to the fourth abnormal notification information described above) including information indicating that an error has occurred in the fixing device (the abutting failure information and the lubricant depletion information described above).

In the image forming apparatus, the first operation may include an operation relating to the fact that the magnitude of the signal output from the motor has fallen out of the first range. The second operation may include an operation relating to the fact that the magnitude of the signal has fallen out of the second range.

A program for implementing the function of an arbitrary component of the apparatus described above (e.g., the image forming apparatus 1) may be recorded in a computer-readable recording a medium, and the program may be read into a computer system for execution. The term "computer system" as used herein refers to hardware such as an operating system (OS) and peripheral equipment. The term "computer readable recording medium" means a portable medium such as a flexible disk, a magneto-optical disk, a ROM, and a CD (Compact Disk)-ROM, or a storage device such as a hard disk built in a computer system. The term "computer readable recording medium" includes those that holds a program for a certain period of time, such as a server and a volatile memory (RAM) inside the computer system as a client in the case where the program is transmitted through a network such as the Internet or a communication line such as a telephone line.

The program described above may be transmitted from a computer system storing the program in a storage device or the like to another computer system via a transmission medium or by a transmission wave in a transmission medium. The term "transmission medium" that transmits a program refers to a medium that has a function of transmitting information, such as a network (communication network) such as the Internet or a communication line such as a telephone line. The program described above may be for realizing part of the above-mentioned functions. The program described above may be one that can be implemented by combining the above-mentioned functions with a program that has been recorded in the computer system, i.e., a so-called differential file (differential program).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus that forms a target image for forming an image on a printing medium using a toner as a colorant, comprising:
- an image forming device that forms a fixed toner image of the target image on the printing medium;
- a motor that drives the image forming device and outputs a signal having a magnitude value corresponding to a value of a driving current of the motor; and
- a controller that
  - drives the motor in a first operation mode or a second operation mode,
  - sets, in a case where the current operation mode is the first operation mode, threshold values which comprise an upper limit value and a lower limit value of a first range as threshold values for the motor signal value, or sets, in a case where the current operation mode is the second operation mode, threshold values which comprise an upper limit value and a lower limit value of a second range as threshold values for the motor signal value,
- performs a first operation where the magnitude value of the signal has fallen out of the first range while driving the motor in the first operation mode, and
- performs a second operation where the magnitude value of the signal has fallen out of the second range while driving the motor in the second operation mode, the magnitude value of the signal in the second range being different from that of the signal in the first range, wherein
- the first operation mode is an operation mode in which the motor is driven at a first RPM, and
- the second operation mode is an operation mode in which the motor is driven at a second RPM different from the first RPM.

2. The image forming apparatus according to claim 1, wherein
- at least one of the upper limit value or the lower limit value of the second range is different from the upper limit value or the lower limit value of the first range.

3. The image forming apparatus according to claim 1, wherein
- the image forming device includes
  - a heater,
  - a fixing member heated by the heater, and
  - a pressing member that is in contact with the fixing member to form a nip with the fixing member,
- the first operation mode is an operation mode in which the motor is driven while causing the pressing member and the fixing member to be in contact with each other by a first force, and
- the second operation mode is an operation mode in which the motor is driven while causing the pressing member and the fixing member to be in contact with each other by a second force different from the first force.

4. The image forming apparatus according to claim 1, wherein
- the image forming apparatus is communicably connected to an information processing apparatus, and
- the first operation and the second operation include an operation of outputting, to the information processing apparatus, notification information including information indicating that an error has occurred in the image forming device.

5. The image forming apparatus according to claim 1, wherein a transport device transports different types of printing media, and the controller drives the motor in an operation mode corresponding to the type of the printing medium, of the first operation mode and the second operation mode.

6. The image forming apparatus according to claim 5, wherein
- the transport device transports plain paper and thick paper as printing media, and
- the controller
  - drives, where the printing medium transported by the transport device is plain paper, the motor in the first operation mode, and
  - drives, where the printing medium transported by the transport device is thick paper, the motor in the second operation mode.

7. The image forming apparatus according to claim 1, wherein
- the first range of a value of a signal output by the motor is a range corresponding to a normal range of the value of the driving current of the motor where the motor is driven in the first operation mode, and
- the second range of the value of the signal output by the motor is a range corresponding to the normal range of the value of the driving current of the motor where the motor is driven in the second operation mode.

8. The image forming apparatus according to claim 7, wherein
- the controller
  - determines, where the motor is driven in the first operation mode, whether or not the value of the driving current of the motor is normal on a basis of whether or not the value of the signal output by the motor is within the first range, and
  - determines, where the motor is driven in the second operation mode, whether or not the value of the driving current of the motor is normal on a basis of whether or not the value of the signal output by the motor is within the second range.

9. The image forming apparatus according to claim 1, wherein
- the first operation includes an operation of outputting, where the motor is driven in the first operation mode, error information indicating that an error has occurred in the image forming device, and the second operation includes an operation of outputting, where the motor is driven in the second operation mode, error information indicating that an error has occurred in the image forming device.

10. The image forming apparatus according to claim 9, wherein the error information includes, in the case where the motor signal value is equal to or less than the set lower limit value, the information indicating that an abutting failure has occurred between the fixing member and the pressing member in the fixing device, and the error information includes, in the case where the motor signal value is equal to or larger than the set upper limit value, the information indicating that depletion of the lubricant in the fixing member has occurred in the fixing device.

* * * * *